E. P. LYNCH.
Cultivators.

No. 143,172.   Patented September 23, 1873.

Witnesses.
Chas C. Wilson
Edmund Masson

E. P. Lynch,
By Atty A. B. Stoughton.

UNITED STATES PATENT OFFICE.

EDWARD P. LYNCH, OF DAVENPORT, IOWA.

IMPROVEMENT IN CULTIVATORS.

Specification forming part of Letters Patent No. 143,172, dated September 23, 1873; application filed October 19, 1870.

*To all whom it may concern:*

Be it known that I, EDWARD P. LYNCH, of Davenport, in the county of Scott and State of Iowa, have invented certain new and useful Improvements in Cultivators; and that the following is a full, clear, and exact description of the same, reference being had to the accompanying drawings making a part of this specification, in which—

Figure 1:
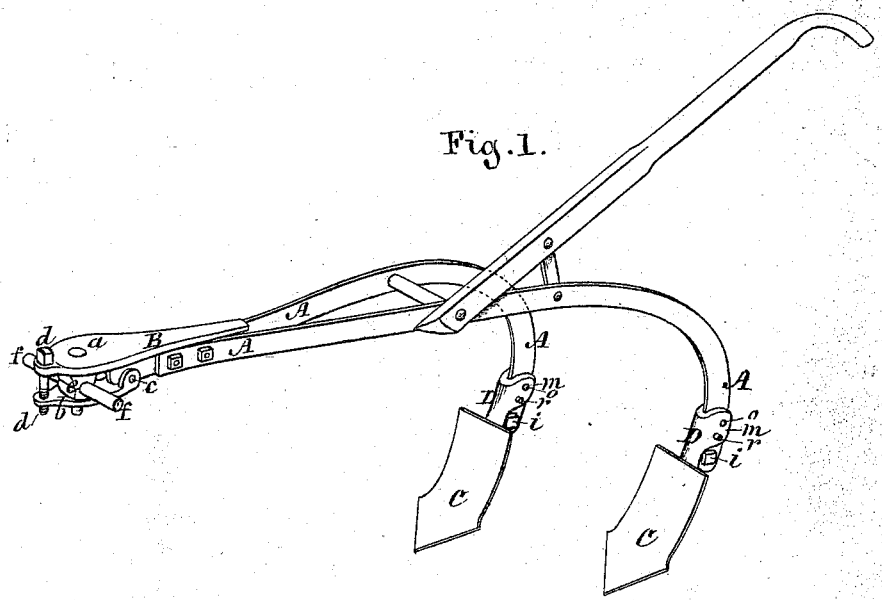
Figure 2:
Figure 3:
Figure 4:
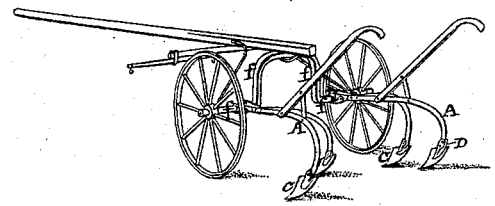

Figure 1 represents, in perspective, so much of the cultivator as will illustrate my invention. Fig. 2 represents a section taken longitudinally through the end of the beam, and the clevis attached thereto. Fig. 3 represents, in perspective, one of the shovels, and the piece or shank to which it is fastened, and by which said shovel is united to the rear bent end of the beam. Fig. 4 represents, in perspective and on a reduced scale, the general appearance of the cultivator as as a whole.

Similar letters of reference, where they occur in the separate figures, denote like parts in all of the drawings.

My invention relates, first, to the construction and operation of the clevis, which is swiveled, hinged, and capable of adjustment, so as to take up all shackle or lost motion between itself and the axle, shaft, or draw-bar to which it is attached. My invention further relates to the construction of the piece or shank to which the shovels are fastened, and the manner of securing them to the rear bent ends of the beams. My invention further relates to the combination, in a walking-wheeled cultivator, of the following devices, viz: A bent axle; a continuous iron beam swiveled or hinged to said axle, the rear end of which beam is bent or curved downward; and a shovel pivoted to the rear end of said continuous beam, and retained in position by a wooden pin, which will break under certain conditions, and allow the shovel to swing back without bending the beams or breaking the cultivator.

To enable others skilled in the art to make and use my invention, I will proceed to describe the same with reference to the drawings.

The beams A A, Fig. 1, which represent one-half of the cultivator only, are of iron, and united in pairs to a cast or wrought iron front piece, B, the upper side $a$ of which may form the upper part of the clevis, by which the cultivators are drawn over the ground. The under part $b$ of the clevis is hinged to the beam, as at $c$, and the front ends of the two parts $a\ b$ are drawn and held together by a screw-bolt, $d$, passing through both. Between or within these clevis pieces $a\ b$ there is arranged a box, $e$, composed of two pieces— one pivoted or swiveled in the upper jaw $a$, and the other pivoted or swiveled to the under piece $b$. The two adjacent faces of these two pivoted pieces are recessed so as to receive and hold upon the part $f$ of a bent axle, shaft, or draw-bar, by which construction the shovels or cultivators may have free motion vertically and laterally upon the axle, without any shackle or lost motion between the clevis and axle, as that is taken up by the screw $d$. To secure the shovel C to the beam I construct a separate shank, D, which I make of cast-iron, in the form represented in Figs. 1 and 3. This shank is made with a groove or recess in its rear side of such a shape and size as to fit loosely upon the beams A, to which it is secured by means of an iron bolt, $i$, on which it is free to turn, as on a pivot. The hole $n$, through which this bolt passes, is elongated, as shown in Fig. 3, to permit it to be adjusted higher or lower on the beam. Through the upper portion of this shank I make a series of holes, $o$, through which is inserted a wooden pin, $r$, this pin also passing through a hole in the beam, by which means the shank is locked to the beam. If desired, in order to lighten the shank, one side may be cut away, leaving only a flange, $m$, near the upper end, as shown in Figs. 1 and 3, leaving only so much as is required for the holes for the pin $r$.

The shank thus made I secure to the shovels C by screw-bolts or rivets, as may be preferred, and when they are thus united the two are secured to the beams by means of the iron bolt $i$ and the wooden pin $r$, as previously stated, and as represented in the drawings. By having a series of holes arranged as represented, the shovels may be set at more or less inclination; and by placing the pin $r$ nearer to or farther from the pivot-bolt $i$ the shovel will have greater or less leverage on the pin, thus adapting the latter to break at greater or less strain on the shovel. This also adapts it to suit the condition of the soil, according as the same is more or less hard.

Having thus fully described my invention, what I claim is—

1. The clevis or attachment for fastening the front end of the beam to the axle, said clevis consisting of the bar B with an upper rigid arm, $a$, and a lower hinged arm, $b$, said arms being perforated to receive the journals of the swivel-boxes $e$, and being secured together by means of a bolt or screw, substantially as set forth.

2. The shank D, provided with a vertical slot, $n$, and the holes $o$, whereby it can be adjusted vertically on the beam, and also pivoted and locked by a break-pin, as set forth.

EDWARD P. LYNCH.

Witnesses:
   A. H. BROOKS,
   J. HERRON.